No. 858,239. PATENTED JUNE 25, 1907.
H. H. WEIGART.
THILL COUPLING.
APPLICATION FILED JUNE 5, 1906.
2 SHEETS—SHEET 1.
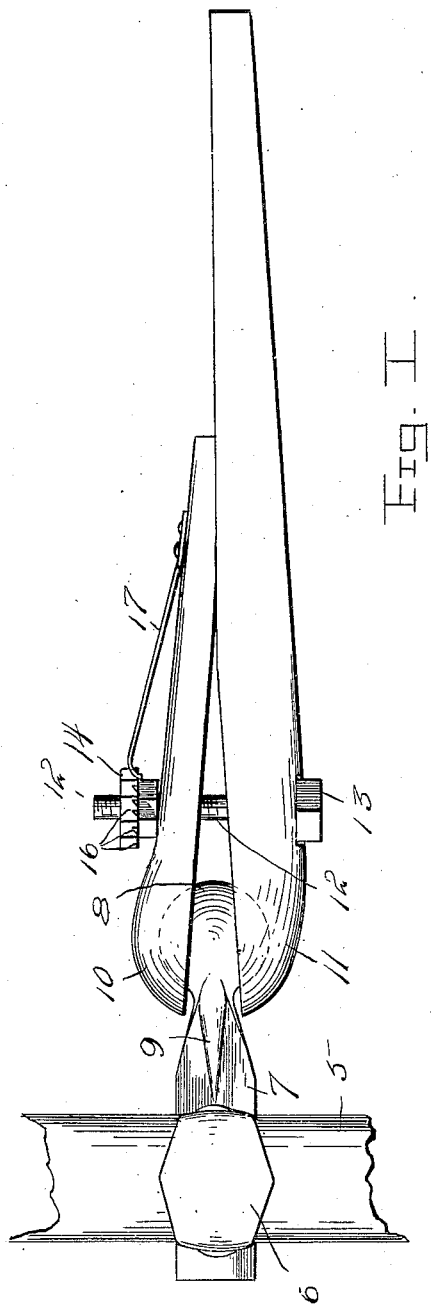
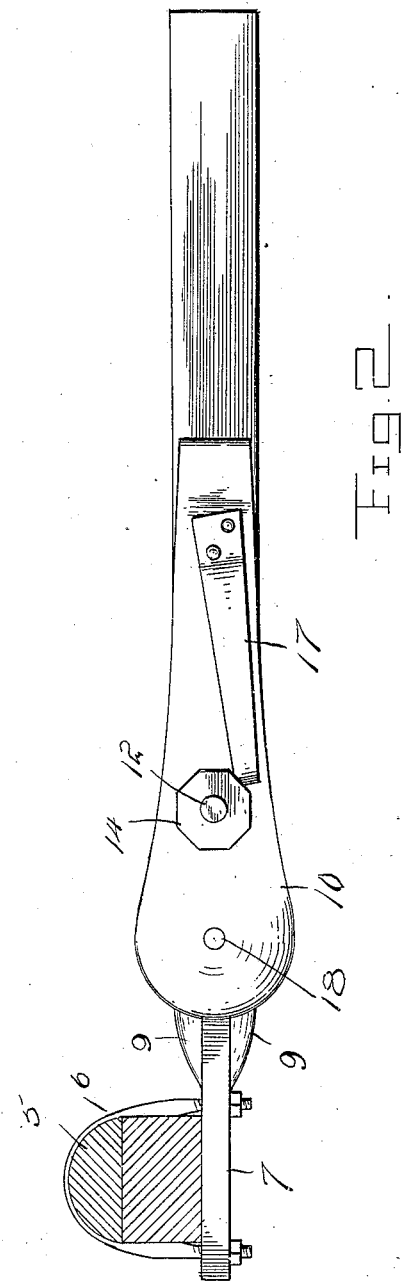
Witnesses
Inventor
Horace H. Weigart,
By 
Attorneys

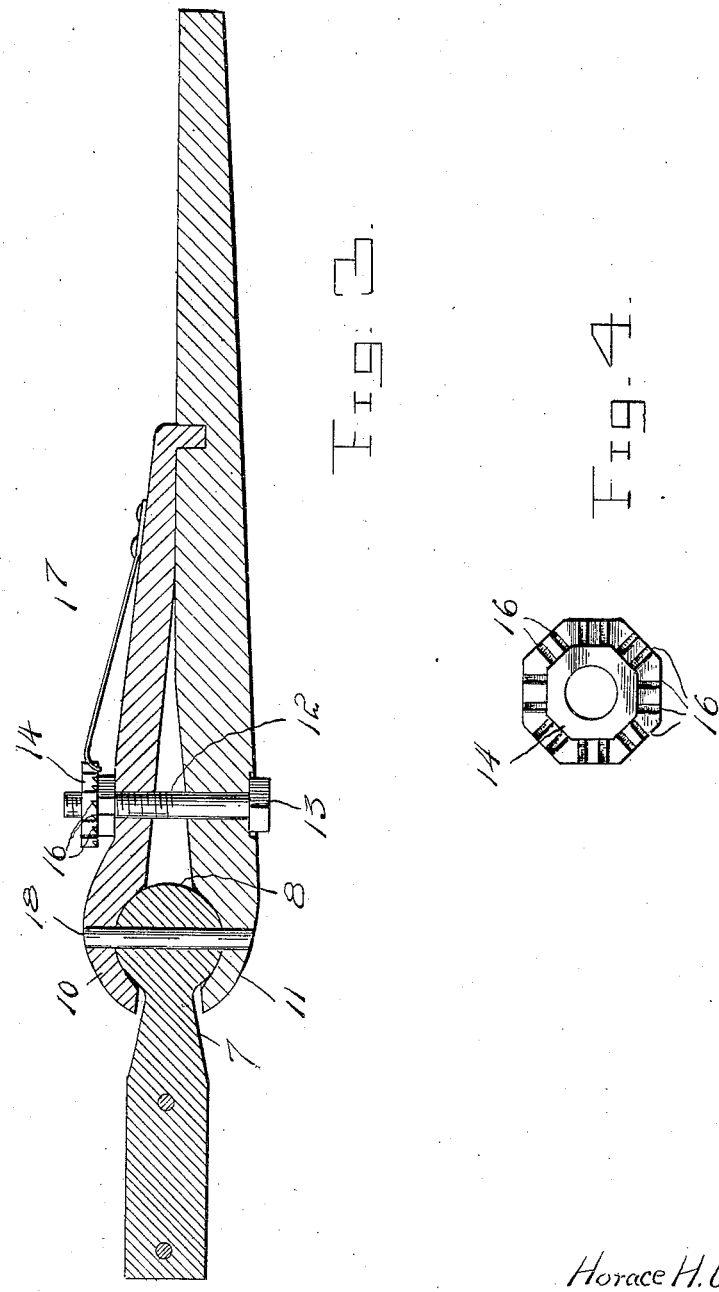

UNITED STATES PATENT OFFICE.

HORACE H. WEIGART, OF INWOOD, CALIFORNIA.

THILL-COUPLING.

No. 858,239. Specification of Letters Patent. Patented June 25, 1907.

Application filed June 5, 1906. Serial No. 320,326.

*To all whom it may concern:*

Be it known that I, HORACE H. WEIGART, a citizen of the United States, residing at Inwood, in the county of Shasta, State of California, have invented certain new and useful Improvements in Thill-Couplings; and I do hereby declare the following to be a full, clear, and exact description of the invention, such as will enable others skilled in the art to which it appertains to make and use the same.

This invention has relation to means for connecting thills with a vehicle axle.

It is the object of the invention to provide a coupling device for the purpose mentioned that shall be durable, noiseless, and not liable, in any of its parts, to get out of operation or to require re-adjustment after once being fixed in place.

The nature of the invention is to be ascertained from a casual examination of the annexed drawings, forming a part of this specification. I will, therefore, proceed at once with a detailed disclosure of the invention, in view of the said drawings, pointing out the improvement with particularity in the subjoined claim.

Of the drawings:—Figure 1 designates a top view of my improved thill coupling. Fig. 2 is a side elevation of the ball-and-socket joint. Fig. 3 is a longitudinal section. Fig. 4 is a bottom plan view of the nut.

The same figures of reference designate the same parts or features, as the case may be, wherever they occur.

In the drawings, 5 designates the vehicle axle and 6 a form of clip or fastening means by which the rear end of the bar 7 is secured to the axle. These parts and features being unimportant so far as the novelty of the invention is concerned may be of any serviceable and satisfactory form. The forward end of the bar 7 is provided with a ball 8, to which strengthening ribs 9 are led from opposite sides of the bar.

10 and 11 constitute clamping members of a ball bearing, each member being cup-shaped on its inner side so that the two may receive the spherical end 8 of the bar 9 between them, and so that when the said members are clamped on the said sphere or ball, as they will be by the bolt 12 passing through them and having a head 13 on one end and a nut 14 turned on the screw-threaded part of the other end, a complete ball-and-socket joint may be formed, connecting the thill members with the bar of the clip or, in other words, forming the thill coupling.

In all instances, in addition to clamping the ball in the cup-shaped sockets of the thill-iron members 10 and 11, I pass a pivot pin 18 through the ends of said members, and through the ball, as shown, to insure safety and strength of the parts.

The head of the nut 14 is provided with notches 16 on the under side of the flange formed on its top, which notches extend up into the periphery of the flange and are engaged by the free end of a spring 17 fixed at its other end upon one of the clamping members, so as to lock the nut against turning.

The two members 10 and 11 constitute the thill irons and they are suitably bolted together, as at 18, and formed or shaped to suit them to be bolted on the thills.

That a thill-coupling constructed in accordance with this invention will be durable, noiseless, efficient in the performance of its offices, and be easy of application and removal, is obvious.

The ball and socket are not provided for the purpose of allowing the thills to turn or be moved in all directions but in order to form a connection that it will be easy to keep from rattling. The thills are designed to move up and down only, the pin 18 permitting of this and also serving to keep the ball 18 in place in its bearings.

Having thus described the invention, what is claimed is:—

In a thill-coupling, a bar having a ball or sphere-shaped end, strengthening ribs leading from opposite sides of the bar to the ball, combined with the thill-iron divided longitudinally into two members, each provided on its rear end with a ball or cup-shaped socket to engage the sphere or ball on the end of the bar between them, a bolt and nut for clamping said two members on said ball or sphere, notches in the head of the said nut, and a spring secured at one end to one of said members and at the other free end engaging one of the notches on the bolt to keep it from turning, a pivot-pin passed horizontally through said cup-shaped clamps and the ball between them, and means for connecting the two thill-iron members.

In testimony whereof, I affix my signature, in presence of two witnesses.

HORACE H. WEIGART.

Witnesses:
A. W. SMITH,
W. H. HORSLEY.